United States Patent [19]

Sextro et al.

[11] 3,872,182

[45] Mar. 18, 1975

[54] THERMOPLASTIC MOULDING COMPOSITION ON THE BASIS OF POLYOXYMETHYLENE

[75] Inventors: Gunter Sextro, Naurod; Karlheinz Burg, Langenhain/Taunus; Rudolf Kern, Mainz; Heinz Schmidt; Ernst Wolters, both of Frankfurt/Main, all of Germany

[73] Assignee: Hoechst Aktiengesellschaft, Frankfurt/Main, Germany

[22] Filed: Feb. 16, 1973

[21] Appl. No.: 332,810

[30] Foreign Application Priority Data
Feb. 22, 1972 Germany............................ 2208168

[52] U.S. Cl................ 260/830 R, 260/13, 260/838, 260/874, 260/901
[51] Int. Cl............................................. C08g 37/04
[58] Field of Search.......... 260/13, 830 R, 838, 874, 260/901

[56] References Cited
UNITED STATES PATENTS

| | | |
|---|---|---|
| 3,218,295 | 11/1965 | Cline..................................... 260/67 |
| 3,219,725 | 11/1965 | Kirkland et al...................... 260/823 |
| 3,231,543 | 1/1966 | Jamison................................. 260/67 |
| 3,256,246 | 6/1966 | Gutweiler et al..................... 260/67 |
| 3,337,507 | 8/1967 | Gutweiler et al..................... 260/67 |
| 3,346,663 | 10/1967 | Kern et al............................ 260/823 |
| 3,600,458 | 8/1971 | Jamison.............................. 260/830 |
| 3,732,333 | 5/1973 | Mantell et al....................... 260/874 |
| 3,754,053 | 8/1973 | Kray et al. .......................... 260/823 |
| 3,763,105 | 10/1973 | Jamison ............................ 260/67 R |
| 3,766,298 | 10/1973 | McAndrew ........................ 260/858 |

*Primary Examiner*—Melvin Goldstein
*Assistant Examiner*—E. A. Nielsen
*Attorney, Agent, or Firm*—Curtis, Morris & Safford

[57] ABSTRACT

A thermoplastic molding composition is composed of a linear poly(oxymethylene) and a graft copolymer the side chains of which consist essentially of oxymethylene groups. The said graft copolymer acts as a nucleating agent; its effectiveness is dependent on its amount, molecular weight and degree of grafting. Molded articles made of said composition show improved mechanical properties.

8 Claims, No Drawings

THERMOPLASTIC MOULDING COMPOSITION ON THE BASIS OF POLYOXYMETHYLENE

It is known that polyacetals (polymethylenes POM) have a strong tendency to crystallize. Even if their melt is undercooled but slightly, a rapid growth of spherulites is observed which, in most cases, are much larger than the length of lightwaves and confer upon the material a considerable opacity. Moreover, owing to the crystallization process a great number of microscopically small fissures and internal tensions are formed in the interior and on the surface of the material. These fissures and internal tensions detrimentally affect the mechanical properties of shaped articles, such as injection moulded articles made of poly(oxymethylene). The aforesaid flaws are the more pronounced, the larger the individual spherulites.

It is also known that by adding talc to poly(oxymethylenes) of high molecular weight and by uniformly distributing the inorganic nucleating agent in the organic material, the crystal structure of injection moulded articles can be rendered more uniform and thus a structure of coarse spherulites can be transformed into a homogeneous structure with sperulites of reduced diameters (cf. German Pat. No. 1,247,645).

It is further known that the spherulite size of poly(oxymethylenes) can be reduced, when before melting the poly(oxymethylenes) these are mixed with certain organic nucleating agents slightly soluble or insoluble in the poly(oxymethylene) melt, e.g., derivatives of imidazole or of pyrazine containing hydroxyl groups (cf. British Pat. No. 1,193,708).

Moreover, it is known that the crystal structure of thermoplastic, crystallizable high-polymers, such as oxymethylene polymers, can be modified during cooling of the polymer melt by means of nucleating agents which are chemically stable at temperatures above the crystallite melting point of the polymer (cf. U.S. Pat. No. 3,367,926). Besides a large number of various chemical compounds there is also mentioned poly(oxymethylene) as a nucleating agent, but there is given no hint, what kind of poly(oxymethylenes) is appropriate as nucleating agent for what kind of oxymethylene polymers.

The present invention provides a thermoplastic moulding composition on the basis of poly(oxymethylene), essentially consisting of a mixture of a. 99.999 to 80 weight % of a linear poly(oxymethylene), optionally containing 0.1 to 20 weight %, calculated on the poly(oxymethylene), of oxyalkylene groups with 2 to 8 adjacent carbon atoms, and b. 0.001 to 20 weight % of a graft copolymer consisting of 1. 0.1 to 30 weight % — calculated on the aforesaid graft copolymer — of a primary polymer with a main chain consisting of aliphatically or aromatically bound carbon atoms and optionally including ether oxygen atoms, the primary polymer having an average molecular weight of at least 400 (number average) and 2. 99.9 to 70 weight % — calculated on the aforesaid graft copolymer — of side chains grafted on the said primary polymer, and consisting of oxymethylene groups and optionally of 0.1 to 20 weight % — calculated on these side chains — of statistically distributed oxyalkylene groups with 2 to 8 adjacent carbon atoms.

The object of the present invention is, moreover, a process of preparing a thermoplastic moulding composition on the basis of poly(oxymethylene) which comprises mixing:

a. 99.999 to 80 weight % of a linear poly(oxymethylene) that includes optionally from 0.1 to 20 weight % — calculated on the aforesaid poly(oxymethylene) — of oxyalkylene groups with 2 to 8 adjacent carbon atoms and b. 0.001 to 20 weight % of a graft copolymer consisting of 1. 0.1 to 30 weight % — calculated on the aforesaid graft copolymer — of a primary polymer with a main chain of aliphatically or aromatically bound carbon atoms, and optionally including ether oxygen atoms, the primary polymer having an average molecular weight of at least 400 (number average), and 2. 99.9 to 70 weight % — calculated on the aforesaid graft copolymer — of side chains grafted on said primary polymer, and consisting of oxymethylene groups and optionally 0.1 to 20 weight % — calculated on these side chains — of statistically distributed oxyalkylene groups with 2 to 8 adjacent carbon atoms, in pulverulent or granulated form each, at a temperature below 100°C, and melting the mixture obtained and homogenizing it at a temperature of from 150°C to 250°C.

Most suitable is a mixture wherein:

a. The linear poly(oxymethylene) is a homopolymer of formaldehyde or of trioxane or a copolymer of trioxane and of a compound able to form a copolymer together with trioxane and reacting monofunctionally (from now on called "POM I");

b. The graft copolymer is a polymerization product made of trioxane, a primary polymer with lateral groups reacting under the polymerization conditions and with a molecular weight of at least 400 (number average), and optionally of a cyclic ether or a cyclic acetal (from now on called "POM II").

Particularly suitable as moulding composition according to the invention is a mixture consisting of:

a. 99.999 to 80 weight % of 1. a homopolymer of formaldehyde or of trioxane or
2. a copolymer made of 99.9 to 80 weight % of trioxane and 0.1 to 20 weight % of a cyclic ether with 3 to 5 ring members or of a cyclic acetal differing from trioxane with 5 to 11 ring members or of a linear polyacetal, and b. 0.001 to 20 weight % of a graft copolymer consisting of 1. 0.1 to 30 weight % — calculated on the aforesaid graft copolymer — of a primary polymer with a main chain of aliphatically or aromatically bound carbon atoms, optionally also including ether oxygen atoms, the primary polymer having an average molecular weight of at least 400 (number average) and 2. 99.9 to 70 weight % — calculated on the aforesaid graft copolymer — of side chains grafted on said primary polymer, these side chains being formed by oxymethylene groups and optionally 0.1 to 20 weight % — calculated on these side chains — of statistically distributed oxyalkylene groups with 2 to 8 adjacent carbon atoms.

The proportion of POM I in the moulding composition according to the invention preferably amounts to to 90 weight % whilst the proportion of POM II preferably amounts to 0.1 to 10 weight %. A moulding composition of 99.5 to 95.0 weight % of POM I and 0.5 to 5.0 weight % of POM II shows particularly good qualities.

Homopolymers of formaldehyde or of trioxane mean those, the terminal hydroxyl groups of which have been chemically stabilized by for example esterification or etherification to prevent degradation.

When using trioxane copolymers, there are especially considered as comonomers for trioxane cyclic ethers with 3 to 5 ring members, preferably epoxides and cyclic acetals differing from trioxane with 5 to 11, preferably with 5 to 8, ring members, particularly cyclic formals of α,ω-diols with 2 to 8, preferably 2 tto 4 carbon atoms, the carbon chain of which can be interrupted by an oxygen atom separated by 2 carbon atoms each, and linear polyacetals in a quantity of 0.1 to 20 weight % each, preferably 0.5 to 10 weight % — calculated on the total quantity of monomers. Best suited are copolymers made of 99 to 95 weight % of trioxane and 1 to 5 weight % of one of the aforesaid co-components.

There are to be mentioned as cyclic ethers e.g., ethylene oxide, styrene oxide, propylene oxide, and epichlorhydrin as well as phenyl-glycidyl ether. As cyclic acetals are used e.g., glycol formal (1,3-dioxolane), butanediol-formal (1,3-dioxepane) and diglycol-formal (1,3,6-trioxocane) as well as 4-chloromethyl 1,3-dioxolane and hexanediol-formal (1,3-dioxonane). Suitable as linear polyacetals are homopolymers as well as copolymers of the specific cyclic acetals and also linear condensates made of aliphatic or cycloaliphatic α,ω-diols with aliphatic aldehydes or thioaldehydes, preferably with formaldehyde. Special preference is given to the use of homopolymers of formals of aliphatic, α,ω-diols with 2 to 8, preferably with 2 to 4 carbon atoms, e.g., poly(1,3-dioxolane) and poly(1,4-butanediol-formal).

The linear poly(oxymethylenes) used as per the invention show melt-index values $i_2$ of from 0.1 to 50, preferably of from 1 to 30 gr/10 min. These values are measured according to the guidelines of German norms DIN 53735 at a temperature of 190°C and under a load of 2.16 kg.

The trioxane copolymers are prepared in known manner by polymerizing the monomers in the presence of catalysts with cationic function, at temperature of from 0° to 100°C, preferably of from 50° to 90°C (cf. e.g. German "Auslegeschrift" 1,420,283). The catalysts used can be protonic acids such as perchloric acid, or Lewis acids, such as tin tetrachloride, arsenic pentafluoride, phosphorus pentafluoride and boron trifluoride, as well as complex compounds and saline compounds, e.g., boron trifluoride-etherates, triethyloxonium — tetrafluoroborate, triphenyl-methyl-hexafluorophosphate and acetylperchlorate. The polymerization can be executed either in bulk, in suspension or in solution. For eliminating instable portions, it is useful to submit the copolymers to a thermal or hydrolytic, controlled partial degradation to terminal primary alcohol groups (cf. e.g., German Auslegeschrift 1,445,273 and 1,445,294).

The homopolymers of formaldehyde or of trioxane used according to the invention are also prepared in known manner by catalytic polymerization of the monomers (cf. e.g., German Auslegeschrift 1,037,705 and German Pat. No. 1,137,215).

Graft copolymers as used according to the invention are polymerization products obtained by polymerization of trioxane with the use of catalysts with cationic function or of high energy radiation in presence of primary polymers with lateral groups reacting under the polymerization conditions and, optionally, in presence of one or several co-components. There can be considered as co-components the same monomeric or polymeric products that are specified above for the copolymerization with trioxane.

The proportion of the primary polymers within the graft copolymers generally amounts to 0.1 to 30, preferably to 0.2 to 10 weight %, whilst the proportion of the trioxane forming the side chains is 99.9 to 70, preferably 99.8 to 90 weight %. The quantity of the optionally used co-component amounts to 0.1 to 20, preferably 0.2 to 10 weight %, calculated on the grafted side chains consisting of trioxane and cocomponent.

Primary polymers with lateral reactive groups mean polymers the lateral reactive groups of which react under polymerization conditions with active poly(oxymethylene) chain ends and allow cross linking of primary polymer and poly(oxymethylene); the chain length (degree of polymerization) of the primary polymer should remain essentially invariable under polymerization conditions and under the conditions of the polymer work-up, as well. The lateral reactive groups can represent e.g., carboxylic acid, carboxylic acid ester, anhydride, hydroxyl, ether, acetal, epoxide, oxacyclobutane, or lactone groups.

The primary polymers have a linear, branched or slightly crosslinked structure and are soluble in molten trioxane or in inert organic solvents, preferably in hydrocarbons, which may be halogenated or nitrated, such as hexane, cyclohexane, methylene chloride, or nitrobenzene. The molecular weight of the primary polymers amount to at least 400, preferably 3,000 to 500,000. The lower limit of the molecular weight is given by the diminishing number of graft reactions per polymer molecule with diminishing molecular weight, and thus by the decreasing nucleating effect of the graft copolymer, whilst the upper limit takes into consideration the generally diminishing polymer solubility with increasing molecular weight. When using polymers of little or no solubility in molten trioxane due to their chemical structure and/or of their high molecular weight, it is recommended that they first be dissolved in an inert solvent and later added, as a solution, to the molten trioxane.

As primary polymers there are used, above all, the following macromolecular compounds:

1. Poly(vinyl ethers), preferably with 1 to 4 carbon atoms in the lateral ether group, e.g., poly(vinylmethyl-ether), poly(vinylethyl-ether), poly(vinylisobutyl-ether);
2. Poly(vinylacetals), e.g., poly(vinylformal), poly(vinylpropional), poly(vinylbutyral);
3. Poly(vinyl esters), preferably with 2 to 5 carbon atoms in the lateral alkylcarboxygroup, e.g., poly(vinyl acetate), poly(vinyl propionate), poly(vinyl butyrate);
4. Poly(acrylic acid esters), preferably with 2 to 5 carbon atoms in the lateral alkoxycarbonyl group e.g., poly(acrylic acid methyl ester), poly(acrylic acid ethyl ester), poly(acrylic acid propyl ester);
5. Poly(methacrylic acid esters), preferably with 2 to 5 carbon atoms in the lateral alkoxycarbonyl group, e.g., poly(methacrylic acid methyl ester), poly(methacrylic acid ethyl ester);
6. Poly(acrylic acid) and poly(methacrylic acid);
7. Poly(vinyl alcohol);
8. Poly(vinylene carbonate);
9. Epoxide resins, e.g., condensates of epichlorhydrin and 2,2-bis(4-hydroxyphenyl)-propane, preferably condensates with an epoxide-equivalent of approximately 0.01 to 0.6 mol/100 gr.
10. Phenolic resin, e.g., epoxidized novolaks with repeating units of the formula

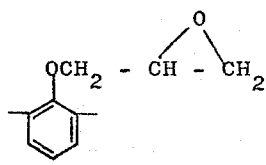

preferably novolaks with an epoxide-equivalent of approximately 0.01 to 0.6 mol/100 g;
11. Epoxidized poly(1,4-butadiene) and epoxidized poly(1,4-isoprene), preferably having an epoxide-equivalent of approximately 0.01 to 1 mol/100 g;
12. Etherified or esterified cellulose (cf. e.g. German Offenlegungsschrift 1,745,698 and German Auslegeschrift 1,668,062).

Particularly good results are obtained when primary polymers classified as per items 2, 9, 10 and 12 are used.

The nucleating effect of POM II is different, depending on the kind and the quantity of primary polymers and on the individual conditions for preparing POM II. As a rule, POM I will be the more nucleated the larger the quantities of POM II added and the higher the proportion, molecular weight and graft degree of the primary polymer in POM II. The use of branched or slightly crosslinked primary polymers, however, soluble to a great extent under polymerization conditions, generally leads to better nucleating effects than the use of linear primary polymers.

The melt index values $i_2$ of the graft copolymers amount to from 0 to 50, preferably from 0.2 to 30 gr/10 min. The values are determined according to the method described before for POM I.

For the preparation of the moulding compositions according to the invention the components are mixed thoroughly — preferably in the presence of stabilizers to prevent thermal or oxidative degradation — in powder or granular form each, at a temperature of less than 100°C, preferably at a temperature of 15° to 50°C; the components are then homogenized in the melt. The homogenizing can be executed in any mixing device, such as drums, calenders, kneaders, or extruders, at a temperature above the crystallite melting point of the components, i.e., at a temperature of 150° to 250°C, preferably at 170° to 200°C. After being homogenized, the mixture either still hot or already cooled off, that is either still plastified or already solid, is granulated, rasped or pulverized. Preferably, the plastified mass is granulated at a temperature of 170° to 250°C or is cooled off by air bath or by water bath first and granulated afterwards.

In principle, POM II is prepared in the same manner as POM I, however, the polymerization mixture contains additionally primary polymers in dissolved or disperse stage besides trioxane and optionally co-components. Under certain circumstances it is also possible to proceed in the presence of an inert solvent, such as cyclohexane.

It is further possible to incorporate the primary polymers to be used according to the invention into oxymethylene homopolymers or into oxymethylene copolymers by mixing primary polymer and poly(oxymethylene), optionally with addition of an inert solvent which dissolves one or both of these components and to have the component react with each other at a temperature of from 0° to 100°C, preferably at 50° to 90°C in presence of catalysts with cationic function (cf. British Pat. No. 1,213,030). The eliminating of unstable portions, e.g., the chemical stabilization of terminal hydroxyl groups is executed by analogy with the procedure described for POM I.

Obviously, the presence of graft copolymers of the said kind causes the moulding composition as per the invention to nucleate, which results in a diminution of the spherulite size and an improvement of the mechanical properties of shaped articles being made of the moulding composition according to the invention. An increased ball indentation hardness can be observed, for example, in comparison to a non-modified linear poly(oxymethylene) (cf. Table 2). Another effect of nucleation is an increase of the crystallization rate, which permits speeding up the processing. This reduction of processing time results particularly in faster cycles for injection moulding and in reduced tolerance ranges for injection moulded articles.

The use of graft copolymers of the said kind - according to the invention - as nucleating agents for linear poly(oxymethylenes) offers the special advantage that the graft polymers can be synthesized at constant quality without necessitating a special purification of the product, such as is required when using certain natural minerals as nucleating agents.

Both components of the moulding composition according to the invention can be mixed with stabilizers and then homogenized in the melt, for obtaining a stabilizing effect against heat, oxygen and light. As heat stabilizers, for example, polyamides, amides of polybasic carboxylic acids, amidines, hydrazines, ureas and poly(N-vinyllactums) are suitable; whereas phenols, especially bis-phenols, and aromatic amines are suitable as oxidation stabilizers, and as light stabilizers derivatives of α-hydroxybenzophenone and of benzotriazol are used; the stabilizers being used in quantities of 0.1 to 10, preferably 0.5 to 5 weight % calculated on the total mixture.

The moulding composition according to the invention can be crushed mechanically, e.g., by chopping or grinding, to granules, chips, flakes or powder. The composition can be worked-up in the thermoplastic state e.g., by injection moulding or extrusion to shaped articles such as bars, sticks, plates, films, ribbons, and tubes. The composition is particularly suitable as technical material for producing shaped articles having stable dimensions and an exact size, which can be used without any further processing.

Preparation of base polymers POM I and POM II a. POM I is prepared according to the publications referred to above, using boron trifluoride as catalyst.

b. POM II is prepared as follows:

First, a homogeneous mixture of trioxane, ethylene oxide or dioxolane and a primary polymer is prepared under a nitrogen atmosphere at a temperature of 60° to 110°C. Depending on the solubility of the primary polymer, the solution stage can be attained by shaking as well as stirring or kneading for about 1 minute to about 12 hours.

100 Grams each of POM I and POM II are charged, under nitrogen, into a polymerization tube with a wall thickness of 0.8 cm and are heated at 70°C in a bath. The tube is shaken thoroughly after 0.2 to 4.0 ml of a solution of boron trifluoride di-n-butyl etherate in cyclohexane (volume ratio 1:20) has been added as catalyst. After a period of a few seconds to 10 minutes the batch solidifies and is then kept at 70°C for 30 minutes.

The polymer thus obtained is then cooled to 0°C and ground immediately to a fine powder. In an autoclave powder, at a concentration of 50 gr polymer/1,000 ml of solvent in a solvent mixture of methanol, water and triethylamine (volume ratio 66:34:0.1), is subjected for 30 minutes to a degradation process under nitrogen at 150°C.

Thereafter the polymer is thoroughly rinsed with acetone and dried at 70°C in a nitrogen current.

The base polymers used according to the invention are compiled in Table 1.

The following examples illustrate the invention.

EXAMPLES

POM I and POM II, pulverulent or each granulated, are mixed together at room-temperature, while adding simultaneously 0.1 weight % of dicyano-diamide and 0.5 weight % bis(2-hydroxy-3-tert.butyl-5-methylphenyl)-methane, each calculated on the total quantity of polymers. When using granules, it is preferred that the stabilizers be incorporated before granulation.

The mixture thus obtained is homogenized at 200°C in a single screw extruder and then granulated after cooling down to room temperature. The residence time in the cylinder of the extruder amounts to 4 minutes.

The spherulite side of the thus obtained product is measured by microscopically examining a film 10 microns thick, prepared by melting the granulated composition at 180°C between 2 glass plates and then crystallizing at 150°C under atmospheric pressure.

Moreover, 4 mm thick plates are moulded with the obtained composition at a temperature of the mould of 190°C and then cooled down to 25°C under pressure. The plates are used to determine the ball indentation hardness according to VDE o302 (loading time 10 seconds).

The spherulite sizes and the mechanical properties of shaped articles made of the moulding composition according to the invention are shown in Table 2. For comparison, the corresponding data of non-nucleated poly(oxymethylene) are also compiled.

TABLE 1

| Polymer | Kind and quantity of components (wt. %) | | | melt index (g/10min) |
|---|---|---|---|---|
| | Trioxane | Comonomer | Primary polymer | |
| POM I/1 | 98 | 2 EO | — | 9.0 |
| /2 | 100 | — | — | 10.5 |
| POM II/1 | 95.5 | 2 DO | 2.5 Poly(vinylacetate), MW = 80000 | 12 |
| /2 | 95.5 | 2 DO | 2.5 Poly(vinylbutyrate), MW = 70000 | 10.3 |
| /3 | 97.5 | 2 DO | 0 5 Cellulosetriacetate MW = 120000 | 10.1 |
| /4 | 95.5 | 2 DO | 2.5 Cellulosetriacetate, MW = 120000 | 4.5 |
| /5 | 93.0 | 2 DO | 5.0 Cellulosetriacetate, MW = 120000 | 2.8 |
| /6 | 95.5 | 2 DO | 2.5 Poly(vinylbutyral), MW = 4000 | 0.8 |
| /7 | 95.5 | 2 EO | 2.5 Epoxide resin A[1] MW > 400 | <0.1 |
| /8 | 95.5 | 2 DO | 2.5 Epoxide resin B[2] MW > 400 | <0.1 |
| /9 | 95.5 | 2 DO | 2.5 ethyl cellulose, MW = 150 000 | 2.7 |
| /10 | 95.5 | 2 DO | 2.5 Poly(vinylmethyl-MW = 20000 [ether), | 8.5 |
| /11 | 95.5 | 2 DO | 2.5 Novolak[3] MW >400 | <0.1 |

Abbreviations:
DO = 1.3-dioxolane
EO = ethylene oxide
MW = molecular weight (number average)
[1] Reaction product of 2,2-bis(4-hydroxyphenyl)-propane and epichlorhydrin; 100 gr of resin contain 0.10 mol of epoxide groups and 0.34 mol of hydroxyl groups.
[2] Reaction product of 2,2-bis(4-hydroxyphenyl)-propane and epichlorhydrin; 100 gr of resin contain 0,025 mol of epoxide groups and 0.40 mol of hydroxyl groups.
[3] Reaction product of phenol and formaldehyde with epoxidized phenolic hydroxyl groups; 100 gr of resin contain 0.63 mol epoxide groups.

TABLE 2

| Example | POM I (wt. %) | | POM II (wt. %) | | spherulite-Size (microns) | ball indentation hardness (kp/cm²) |
|---|---|---|---|---|---|---|
| I | 100 I/1 | Granules | — | | 500 | 1435 |
| II | 100 I/2 | '' | — | | 250 | 1680 |
| 1 | 98 I/1 | '' | 2 II/1 | powder | 90 | 1465 |
| 2 | 98 I/1 | '' | 2 II/2 | '' | 110 | 1460 |
| 3 | 98 I/1 | '' | 2 II/3 | '' | 70 | 1465 |
| 4 | 98 I/1 | '' | 2 II/4 | '' | 35 | 1475 |
| 5 | 98 I/1 | '' | 2 II/5 | '' | 10 | 1510 |
| 6 | 99 I/1 | '' | 1 II/6 | Granules | 60 | 1470 |
| 7 | 98 I/1 | '' | 2 II/6 | '' | 40 | 1475 |
| 8 | 95 I/1 | '' | 5 II/6 | '' | 25 | 1505 |
| 9 | 99,9 I/1 | '' | 0,1 II/7 | '' | 50 | 1470 |
| 10 | 99 I/1 | '' | 1 II/7 | '' | 10 | 1510 |
| 11 | 98 I/1 | '' | 2 II/7 | '' | 6 | 1515 |
| 12 | 98 I/1 | '' | 2 II/8 | '' | 15 | 1510 |
| 13 | 98 I/1 | '' | 2 II/9 | '' | 40 | 1490 |
| 14 | 98 I/1 | '' | 2 II/10 | '' | 90 | 1480 |
| 15 | 99,99 I/1 | powder | 0,01 II/11 | '' | 70 | 1460 |
| 16 | 99,9 I/1 | '' | 0,1 II/11 | '' | 40 | 1480 |
| 17 | 99 I/1 | '' | 1 II/11 | '' | 12 | 1515 |
| 18 | 98 I/2 | Granules | 2 II/4 | powder | 40 | 1725 |

What is claimed is:

1. A thermoplastic molding composition based on polymers predominantly comprising oxymethylene units and essentially consisting of a mixture of
   a. 99.999 to 80 wt. % of a linear poly(oxymethylene) or a copolymer containing oxymethylene units and 0.1 to 20 wt. % of oxyalkylene groups, based on the weight of said copolymer, with 2 to 8 adjacent carbon atoms, and
   b. 0.001 to 20 wt. % of a graft copolymer consisting of
      1. 0.1 to 30 wt. %, based on the weight of said graft copolymer, of a primary polymer with a main chain consisting of aliphatically or aromatically bound carbon atoms which may be interrupted by ether oxygen atoms, the primary polymer having a number average molecular weight of at least 400 and
      2. 99.9 to 70 wt. %, based on the weight of said graft copolymer, of side chains grafted on said primary polymer, said side chains consisting of oxymethylene groups which may be interrupted by 0.1 to 20 wt. % based on the weight of said side chains, of statistically distributed oxyalkylene groups with 2 to 8 adjacent carbon atoms.

2. A process for preparing a thermoplastic molding composition based on polymers predominantly comprising oxymethylene units, which comprises mixing
   a. 99.999 to 80 wt. % of a linear poly(oxymethylene) or a copolymer containing oxymethylene units and 0.1 to 20 wt. % of oxyalkylene groups, based on the weight of said copolymer, of oxyalkylene groups having 2 to 8 adjacent carbon atoms
   b. with 0.01 to 20 wt. % of a graft copolymer consisting of
      1. 0.1 to 30 wt. %, based on the weight of said graft copolymer, of a primary polymer with a main chain consisting of aliphatically or aromatically bound carbon atoms which may be interrupted by ether oxygen atoms, the primary polymer having a number average molecular weight of at least 400, and
      2. 99.9 to 70 wt. %, based on the weight of said graft copolymer, of side chains grafted on said primary polymer, said side chains being formed by oxymethylene groups which may be interrupted by 0.1 to 20 wt. %, based on the weight of said side chains, of statistically distributed oxyalkylene groups with 2 to 8 adjacent carbon atoms, in pulverulent or granulated form, each at a temperature below 100°C, and melting and homogenizing said mixture at a temperature of from 150° to 250°C.

3. A thermoplastic molding composition based on polymers predominantly comprising oxymethylene units and consisting essentially of a mixture of
   a. 99.999 to 80 wt. % of a linear poly(oxymethylene) or a copolymer containing oxymethylene units and 0.1 to 20 wt. %, based on the weight of said copolymer of oxyalkylene groups, with 2 to 8 adjacent carbon atoms, and
   b. 0.001 to 20 wt. % of a graft copolymer consisting of
      1. 0.1 to 30 wt. %, based on the weight of said graft copolymer, of a primary polymer which is a polyepoxide having a main chain consisting of aliphatically or aromatically bound carbon atoms which may be interrupted by ether oxygen atoms, the primary polymer having a number average molecular weight of at least 400, and
      2. 99.9 to 70 wt. %, based on the weight of said graft copolymer, of side chains grafted on said primary polymer, said side chains consisting of oxymethylene groups which may be interrupted by 0.1 to 20 wt. %, based on the weight of said side chains, of statistically distributed oxyalkylene groups with 2 to 8 adjacent carbon atoms.

4. A thermoplastic molding composition according to claim 3 wherein the polyepoxide is a reaction product of epichlorhydrin and 2,2-bis(4,4-hydroxyphenyl)-propane.

5. A molding composition according to claim 3 wherein the polyepoxide is an epoxidized poly(1,4-butadiene).

6. A molding composition accirding to claim 3 wherein the polyepoxide is an epoxidized poly(1,4-isoprene).

7. A thermoplastic molding composition wherein the polyepoxide has an epoxide equivalent of 0.01 to 1 moles per 100 grams.

8. A process for preparing a thermoplastic molding composition based on polymers predominantly comprising oxymethylene units, which comprises mixing
   a. 99.999 to 80 wt. % of a linear poly(oxymethylene) or a copolymer containing oxymethylene units and 0.1 to 20 wt. %, based on the weight of said copolymer, of oxyalkylene groups having 2 to 8 adjacent carbon atoms,
   b. with 0.01 to 20 wt. % of a graft copolymer consisting of
      1. 0.1 to 30 wt. %, based on the weight of said graft copolymer, of a primary polymer which is a polyepoxide having a main chain consisting of aliphatically or aromatically bound carbon atoms which may be interrupted by ether oxygen atoms, the primary polymer having a number average molecular weight of at least 400, and
      2. 99.9 to 70 wt. %, based on the weight of said graft copolymer, of side chains grafted on said primary polymer, said side chains being formed by oxymethylene groups which may be interrupted by 0.1 to 20 wt. %, based on the weight of said side chains, of statistically distributed oxyalkylene groups with 2 to 8 adjacent carbon atoms, in pulverulent or granulated form, each at a temperature below 100°C., and melting and homogenizing said mixture at a temperature of from 150° to 250°C.

* * * * *

UNITED STATES PATENT OFFICE
CERTIFICATE OF CORRECTION

Patent No. 3,872,182   Dated March 18, 1975

Inventor(s) Gunter Sextro et al.

It is certified that error appears in the above-identified patent and that said Letters Patent are hereby corrected as shown below:

At column 10, line 66, in line 1 of claim 7, after "composition" insert --according to claim 3--

Signed and Sealed this second Day of March 1976

[SEAL]

Attest:

RUTH C. MASON
Attesting Officer

C. MARSHALL DANN
Commissioner of Patents and Trademarks